INVENTORS
AUBURN TAYLOR
EMORY W. WORTHINGTON
BY
ATTORNEY

Jan. 8, 1946.  A. TAYLOR ET AL  2,392,706
INKING MECHANISM
Filed May 23, 1942  6 Sheets-Sheet 2
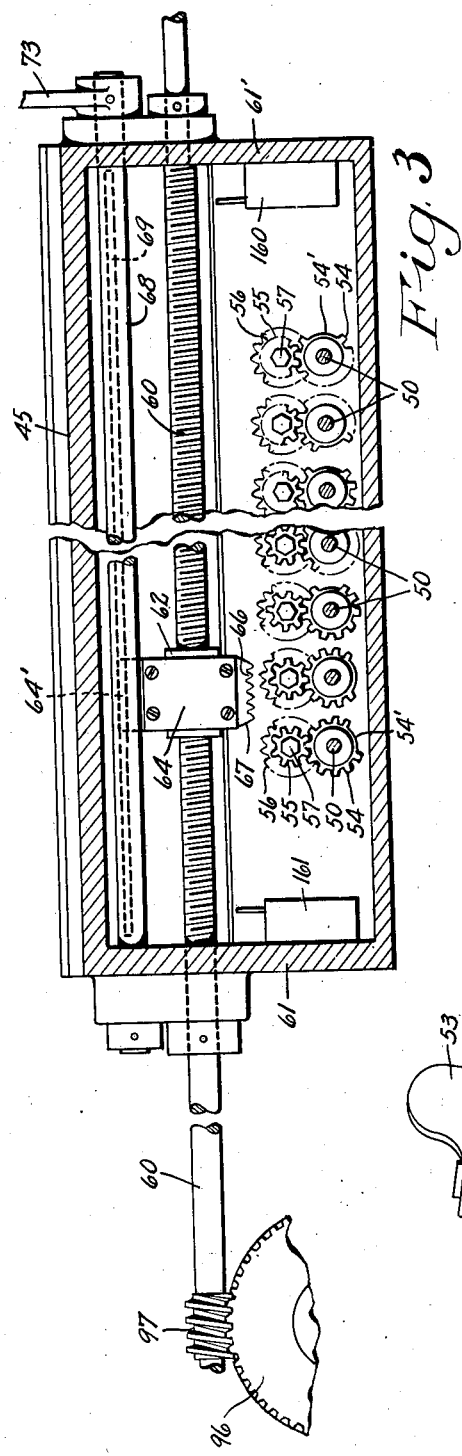
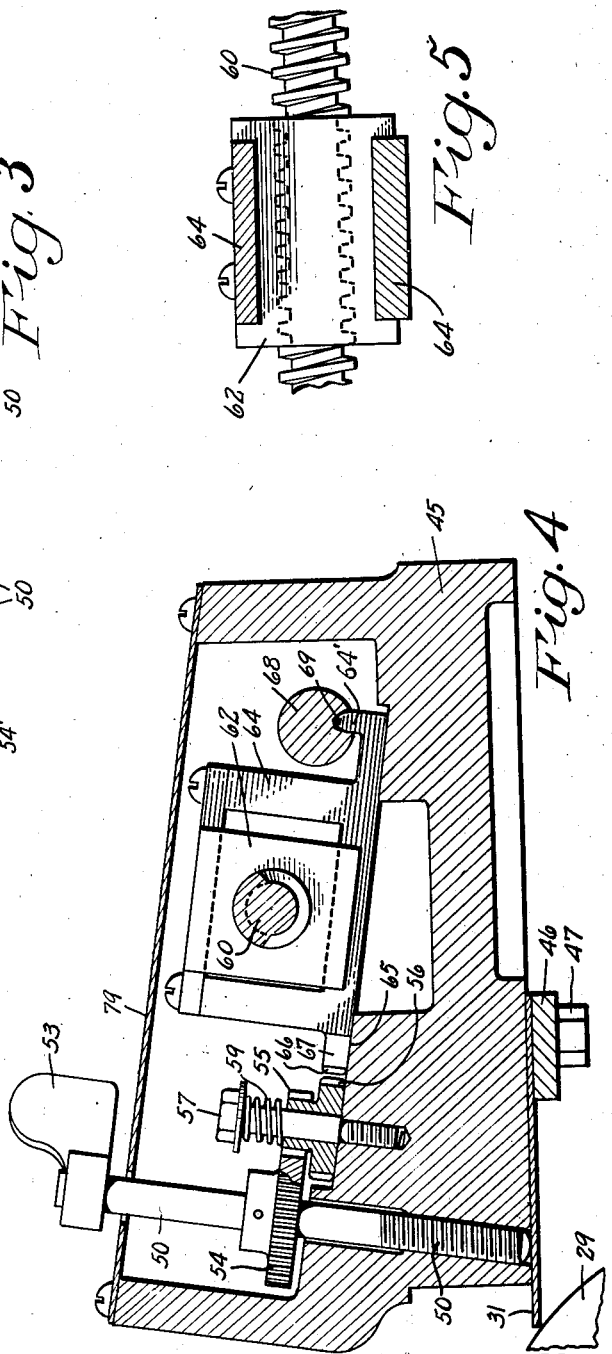
INVENTORS
AUBURN TAYLOR
EMORY W. WORTHINGTON
BY
ATTORNEY Jan. 8, 1946.  A. TAYLOR ET AL  2,392,706
INKING MECHANISM
Filed May 23, 1942   6 Sheets-Sheet 3
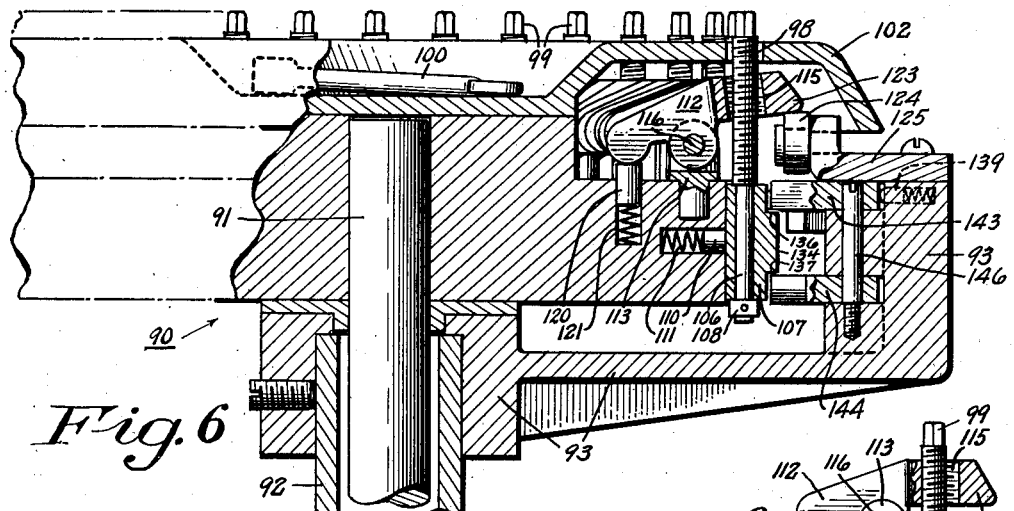
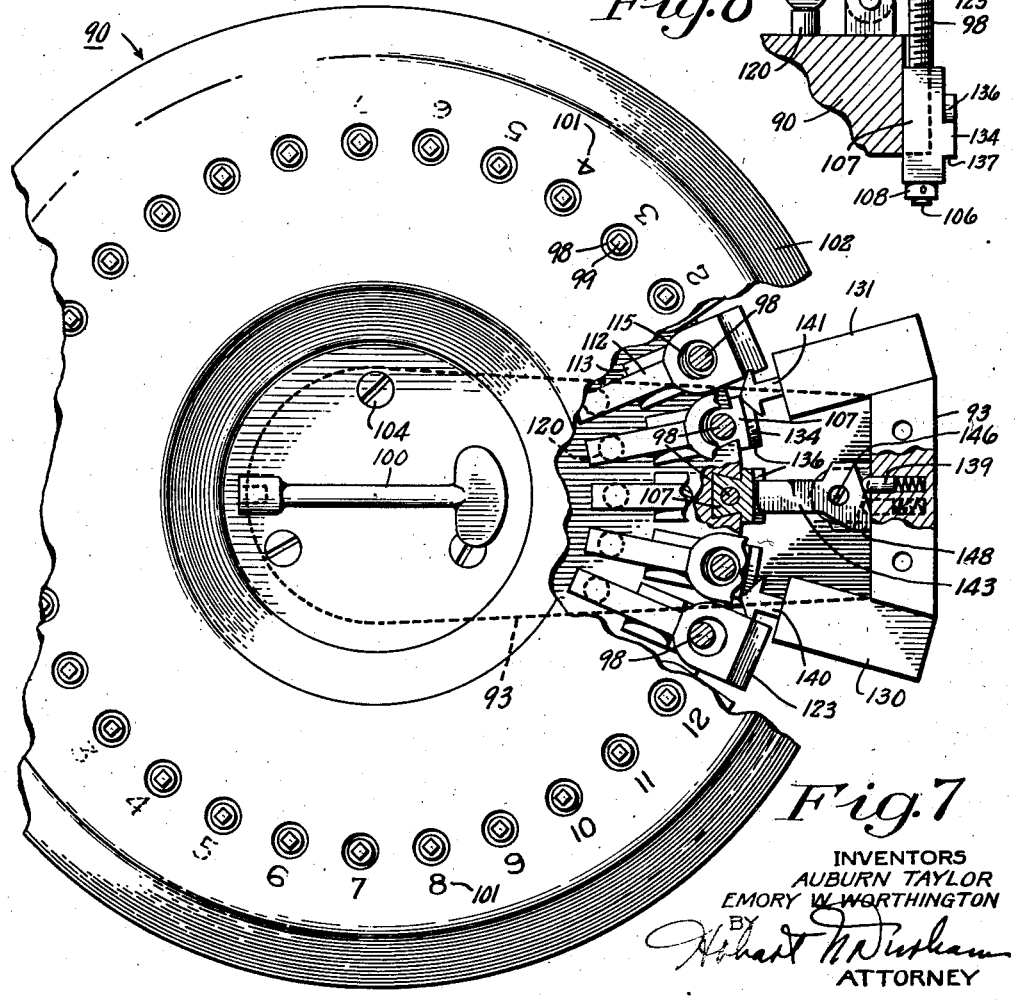
INVENTORS
AUBURN TAYLOR
EMORY W. WORTHINGTON
BY
ATTORNEY Jan. 8, 1946.  A. TAYLOR ET AL  2,392,706
INKING MECHANISM
Filed May 23, 1942  6 Sheets-Sheet 4

INVENTORS
AUBURN TAYLOR
EMORY W. WORTHINGTON
BY
ATTORNEY

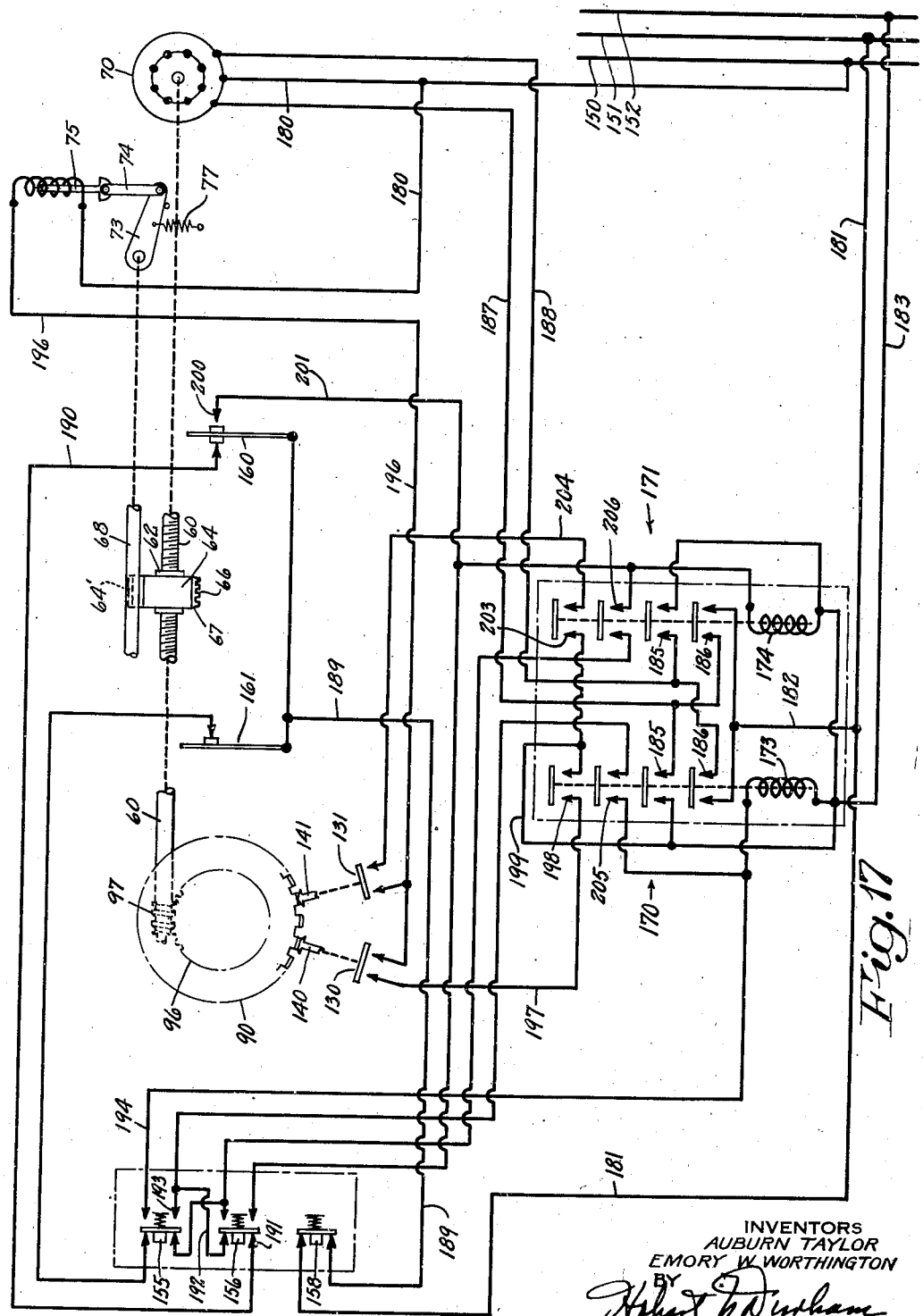

INVENTORS
AUBURN TAYLOR
EMORY W. WORTHINGTON
ATTORNEY

Patented Jan. 8, 1946

2,392,706

UNITED STATES PATENT OFFICE 2,392,706

INKING MECHANISM

Auburn Taylor, Charleston, W. Va., and Emory W. Worthington, Chicago, Ill., assignors to The Goss Printing Press Company, Chicago, Ill., a corporation of Illinois Application May 23, 1942, Serial No. 444,208

16 Claims. (Cl. 101—365)

The present invention relates to new and useful improvements in inking mechanisms for high speed rotary printing presses.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 3 is a fragmentary sectional view of an ink fountain in accordance with the present invention and forming a part of the mechanism shown in Figures 1 and 2.

Figure 4 is a sectional view taken on the line 4—4 of Figure 3.

Figure 5 is a detailed sectional view taken on the line 5—5 of Figure 4.

Figure 6 is a fragmentary side elevation, with certain parts broken away, of the control mechanism shown more generally in Figure 1.

Figure 7 is a top plan of the control shown in Figure 6, with certain parts broken away.

Figure 8 is a fragmentary detailed view with certain parts shown in section of a portion of the switch mechanism shown in Figures 6 and 7.

Figure 17 is a wiring diagram for the embodiment illustrated in the other figures of the drawings.

Figure 1:
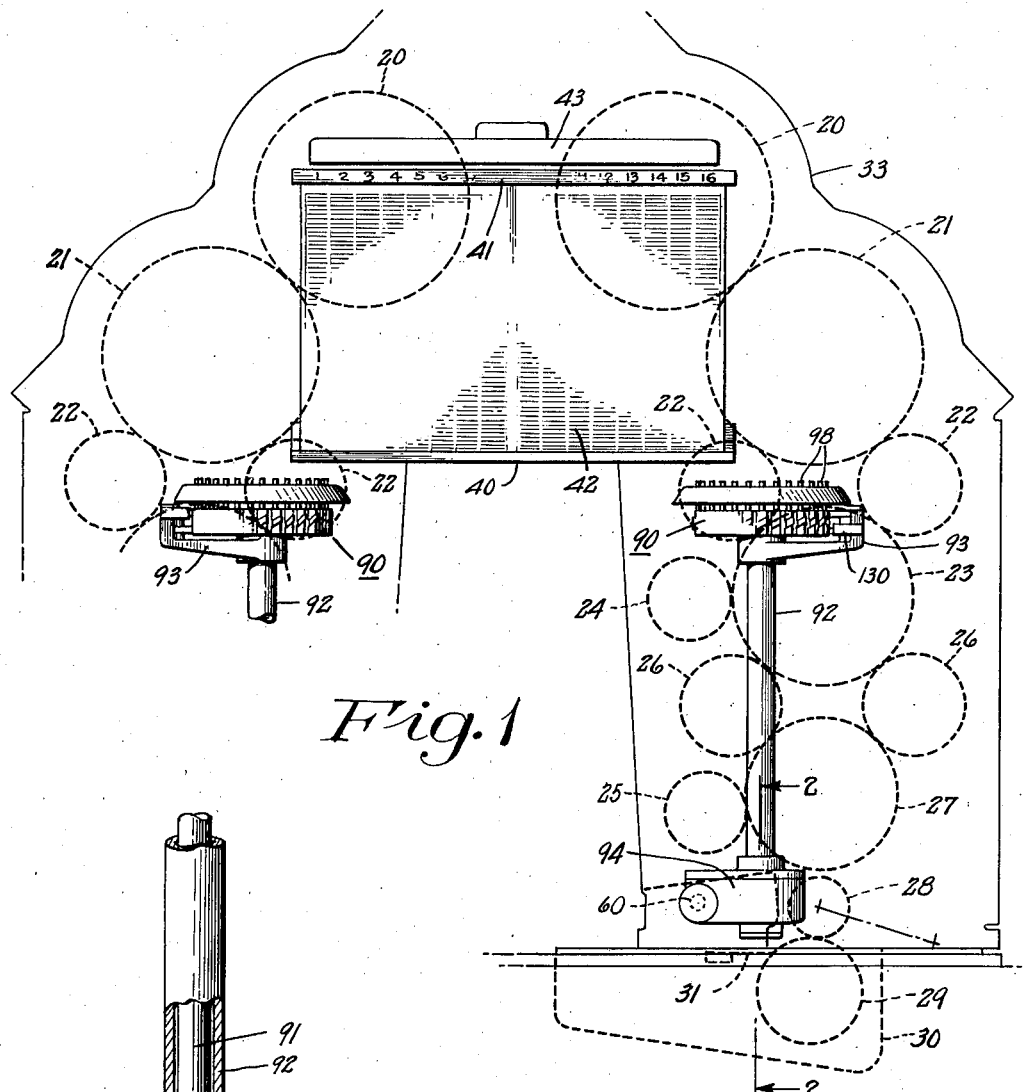
Figure 1 is a fragmentary diagrammatic end elevation of a typical and illustrative embodiment of the present invention as applied to a rotary newspaper printing press.
Figure 2:
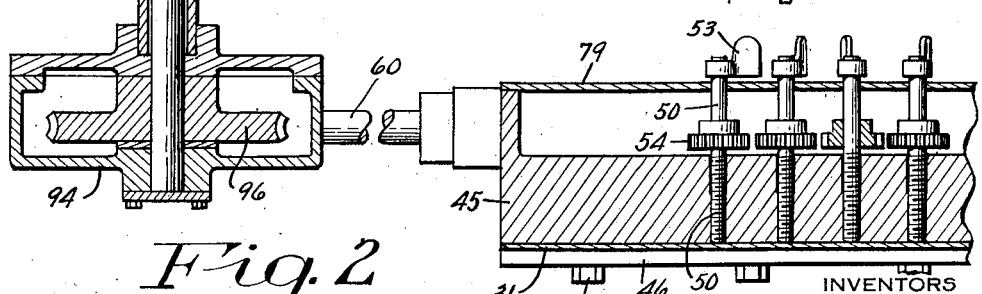
Figure 2 is a fragmentary sectional view on the line 2—2 of Figure 1.
Figure 9:
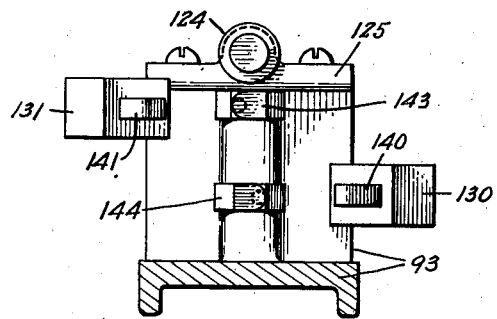
Figure 9 is a sectional view taken on the line 9—9 of Figure 7.

The present invention has for its object the provision of a novel and improved ink fountain for high speed rotary printing presses in which the ink fed from different width-wise or columnar portions of the fountain may be regulated from an ink control mechanism positioned at a distance from the fountain. Another object of the invention is the provision of an improved inking mechanism for rotary printing presses having means for automatically increasing or decreasing the ink fed from different portions of the fountain, the change in the regulation being automatically and selectively effected in accordance with the manually selected setting of various control members. The invention also provides in a rotary perfecting printing press having control means which may be varied in accordance with the appearance of the various columns on the printed sheet, the control means serving to effect proper adjustment of the ink feeding means through a power operated member operating on the ink feeding means in accordance with the setting of the control members.

In accordance with the illustrative embodiment of the invention which is shown as applied to a rotary perfecting couple of a newspaper press having two inking mechanisms each of which is capable of being adjusted throughout its length to supply different quantities of ink to the different columns to be printed in accordance with the varying requirements of these columns, at one end of the press is provided a support for a sheet which has been printed. Adjacent the support for the printed sheet are two controls each of which is provided with a plurality of control members equal to the number of columns on each side of the sheet, and these individual control members are preferably indexed and arranged in sequence in accordance with the columns of the printed sheet.

The ink fountain is provided with a similar number of regulating means, generally comprising a series of adjusting screws bearing against the doctor blade to regulate the amount of ink remaining on the fountain roller to be fed to the corresponding positions of the printing plate. The adjusting screws are preferably arranged in a series along the length of the fountain blade, and may be manually turned to decrease or increase the amount of ink fed. Each of the screws is also provided with a gear, and along the series of screws extends a threaded rod carrying a finger or rack for engagement with the gears in succession, as the finger or rack is moved length-wise of the blade by rotation of the threaded rod. Means are also provided for selectively moving the finger or rack into and out of engagement with the gears as it passes them so that it may pass any or all of them idly or may engage and turn selective ones of the gears. As the rack moves in one direction the gears are turned to increase the feed of ink while as the rack is reversely moved the gears are turned to decrease the amount of ink, thereby successively varying the adjustment of ink for each columnar portion of the ink fountain.

The control means includes a number of individual control members each corresponding to a particular columnar portion of the ink fountain, and means are provided for controlling the operation of the moving rack or finger in accordance with the setting of the various individual control members. Preferably a member senses the setting of the individual control members in succession, and in timed relation to the movement of the finger or rack across the ink fountain. Thus a complete back and forth movement of the finger the length of the fountain effects the necessary selective decreases and increases in the feed of the ink from the fountain to the plates thereby correcting the irregularities in inking as noted from the sample sheet.

Means are also preferably provided for restoring each of the control means to an inoperative position after the control has been effected, thereby clearing the control mechanism so as to minimize the danger of error, as well as to increase the speed with which the operator may effect the ink adjustment. In this way the number of imperfect copies is greatly reduced notwithstanding the fact that the press may be printing one hundred or more copies per minute.

Referring now in detail to the illustrative embodiment of the invention, Figure 1 shows the application to a conventional unit type of high speed rotary newspaper press having impression cylinders 20, plate cylinders 21, form rollers 22, ink distributing drums 23 and 27, distributing rollers 24 and 25, transfer rollers 26, ductor roller 28 receiving ink from a fountain roller 29 and transferring it perpendicularly to the distributing drum 27. Fountain roller 29 runs in the ink fountain 30 at a relatively slow speed, and the quantity of ink remaining on the roller to be picked up by the ductor roller 28 is regulated by a doctor knife 31 which may be pressed toward the fountain roller 29 in varying degrees of pressure to regulate with precision the amount of ink transferred to the rollers and drums and thereby to the printing surface of the plates on cylinder 21.

The various drums, rollers and cylinders are rotatably mounted in the frame 33, and certain of them are geared together while others are driven by frictional contact. The various rollers, drums and cylinders need not be described in further detail as they are of conventional construction. Typically, the cylinders, drums and rollers may be of the standard four page width, and thus the printing plates on cylinder 21 would normally include thirty-two columns length-wise of the cylinder, each column being arranged circumferentially of the cylinder. Such a press would normally print a web of paper four pages wide which would be slit into two longitudinal halves and cut to provide separate sheets, each sheet being sixteen columns wide.

Mounted on the frame 33 is a support 40 adapted to receive and hold a printed sheet two pages wide which has been printed by the printing unit. At the top of the support is a clamp 41 which may be conventionally numbered, the several numbers being located above the corresponding columns of the printed sheet 42 on the support. A source of light 43 may extend across the top of the printed sheet to facilitate the operator's judgment of the quality of printing.

With the printed sheet 42 in position, the operator may readily determine by inspection that certain of the columns are being supplied with the proper amount of ink, others of the columns are receiving an excess of ink while still others of the columns are receiving an insufficient amount of ink, and to correct this condition the operator should make the proper adjustment of the ink fountain in the shortest possible time, as such adjustments are normally made while the press is operating at full speed and newspapers are being continuously printed.

The doctor blade 31 bearing against the fountain roller 29, extends from one end of the press to the other and is rigidly secured to a blade support 45 by means of clamp bar 46 and screws 47, the mounting being such that the outer edge of the blade 31 may be moved toward or away from the fountain roller 29.

Blade support 45 is provided along its length with a series of screw threaded members 50 threaded into apertures in the support 45 with their lower ends bearing against the upper surface of the doctor blade 31 close to its free end. In the usual case one such screw 50 would be provided for each column printed, and thus in the present embodiment there would be thirty-two such threaded members 50 for each ink fountain. The threaded members 50 are uniformly spaced along the length of the fountain so that each one is alined with its particular column, and the flexibility of the doctor blade 31 along its length is such that regulation of one of the screws 50 does not greatly affect the amount of ink being fed to the adjacent columns at either side. Each of the screws 50 is provided at its upper end with a wing 53 by which it may be manually turned for adjustment independently of the other columns.

Means are provided for selectively and successively rotating each of the screws 50 first in one direction and then in the other direction, to vary the amount of ink fed from the corresponding portion of the fountain. As embodied each of the screws 50 is provided with a gear 54 affixed thereto, and the gears 54 are preferably all of the same size and are arranged in series in substantial alinement. Meshing each of the gears 54 is a double pinion 55 rotatably mounted by means of a stud 57 projecting into an upper face of the blade support 45, and gears 55 are held in position by their individual springs 59. Preferably the two gear faces of the gears 55 are of different size, the smaller meshing with the gear 54 so as to give a more minute turning and greater mechanical advantage.

Parallel with the series of adjusting screws 50, and at right angles to them extends a threaded shaft 60 journaled in the end walls 61, 61' of the blade support 45. On the shaft 60 is a threaded block 62 which can be moved from one end 61 to the other 61' and vice versa by rotation of the shaft 60. Threaded block 62 is channeled on its upper and lower parallel sides to receive a hollow frame 64 which can slide toward and from the gears 55. The hollow frame 64 and the shaft 60 are so positioned and dimensioned that the lower surface of the frame 64 slides on the flat marginal portion 65 of the blade support 45. The forward edge of the hollow frame is provided with gear teeth 66 to form a short rack or finger member and the sliding movement of the frame 64 with reference to the shaft 60 is such that the teeth of rack 67 may be moved into and out of engagement with the teeth 56 forming the lower gear portion of the gear 55.

Means are also provided for positively moving the rack teeth 66 into and out of engaging position with respect to the gears 55. For this purpose a second shaft 68, parallel with shaft 60 is also rotatably mounted in the end wall 61 and 61'. Throughout its length shaft 68 is provided with a slot-way 69 into which fits, as a gear tooth, a rearwardly extending portion 64' of the hollow frame 64. By rocking shaft 68, the rack teeth 66 may be moved into and out of engaging position with respect to the several gears 55.

A reversible motor 70 is geared to shaft 60 so as to drive the rack 67 in either direction. At one end, shaft 68 is connected to an arm 73 which is connected by link 74 to solenoid armature 75 so it may be rocked to and from engaging position. A spring 77 is provided when normally holding the rack 67 in its inoperative position in which position it would move back and forth along the fountain without changing the adjustment of any of the blade adjusting screws 50.

As the rack 67 moves across the fountain, from the left to right in Figure 3, solenoid 75 rocks the shaft 68 properly timing the rocking of shaft 68 with reference to the travel of the threaded block 62, any one or more selected screws 50 may be rotated in a counter-clockwise direction to increase the amount of ink fed to their respective columns. Likewise on the reverse rotation of the shaft 60 causing the block 62 and rack 67 to travel from right to left, the timed rocking of shaft 68 will cause any one or more selected screws 50 to be moved in a clockwise direction thereby decreasing the amount of ink fed to the corresponding columns.

A cover 79 is conveniently provided on the upper surface of the support 45 enclosing the gears 54, 55, the rods 60 and 68 and the travelling rack member 67.

To insure more rapid and certain operation of the columnar adjusting means, a control member is preferably provided at an end of the fountain adjacent to the sheet support 40, and is provided with a plurality of individual controls which are numbered or otherwise indexed to their respective columns.

Constructional details and mode of operation of the control member is shown in detail in Figures 6 to 16, and illustratively comprises a rotatable control member 90 mounted on the upper end of a vertical shaft 91 which is mounted at one end of the press and extending above an end of the fountain. Shaft 91 is enclosed within a tubular housing 92, and is suitably journaled for rotation in an upper bracket 93 and a lower housing 94. At its lower end shaft 91 is provided with a worm gear 96 meshing with the worm 97 on shaft 60 so that the rotatable member 90 makes one complete revolution for each complete traverse of the rack or finger 67.

Around its periphery the rotatable member 90 is provided with a circular series of adjusting screws 98 each having a squared head to which a key 100 may be fitted to turn them in either direction. As illustratively embodied thirty-two of the control screws 98 are provided, one for each column-width of the ink fountain and press; and these thirty-two screws are divided into two series of sixteen each, which are conventionally identified by means of column numbers 101 formed on the upper surface of a cover plate 102 secured to the upper surface of member 90 by screws 104, and apertured so that the square heads 99 are accessible through the cover plate.

Each of the screws 98 is provided with a lower unthreaded portion 106 by which the screw is rotatably mounted in a slidable block 107 mortised with a corresponding slot to the edge of the disk members 90, and a pin collar 108 is provided to hold the screws against axial movement in their slide blocks. Thus all of the screws 98 are held parallel to each other and to the shaft 91, and are mounted for sliding movement axially of the disk member 90. In each mortised slot is provided a spring pressed plunger 110 bearing against a face of the block 107 and forced toward the block by compression spring 111, frictionally holding the blocks 107 in any desired position.

Cooperating with each screw 98 is a rocker arm 112 each rocker arm being pivotally supported on the control disk 90 by means of a bracket 113. Each of the rocker arms 112 near its outer end is provided with a threaded opening 115 of considerably larger diameter than, but of the same pitch as screw 98, the lower portion of the threaded aperture 115 being above the pivot pin 116 so that rocking of the arm 112 in one direction causes engagement of the threads while rocking of the arm in the other direction causes the threads to be released. The plunger 120 is mounted in the spring receiving aperture 121 and presses against the inner head of each rocker arm 112 to hold the threaded portion 115 normally in engagement with the threads of screws 98 thereby normally preventing movement of the slide 107 except by turning of the screw 98. Each of the screws 98 may be turned in one direction to raise the corresponding blocks 107, or in the other direction to lower the corresponding blocks, and the blocks 107 are thus held in the desired positions so long as the rocker arms 112 are in their normal engagement. Figure 8 of the drawings shows the threaded portions 98 and 115 in engagement with the corresponding block 107 moved to a relatively low position.

The feed end 123 of each rocker arm 112 is provided with a nose engageable with a roller 124 freely rotatable and supported by a bracket 125 projecting inwardly from the frame member 93, and as the disk member 90 is rotated, the rocker arms 112 are successively lifted to free the screws 98 so that the blocks 107 may be individually moved against the friction of plungers 110.

Switch means are provided to be actuated by the slide blocks 107 when they have been moved from their normal positions, and one such switch 130 is provided to be operated by slide blocks 107 in a raised position, while another switch 131 is to be actuated by slide blocks 107 in their lowered position, and means are also provided for varying the time during which the switches 130 and 131 are closed in accordance with the degree to which the slide blocks are moved away from their normal or central position. Means are also provided for restoring each of the blocks 107 to its normal position after one or the other of the switches 130, 131 has been actuated by it, and while the corresponding rocker arm 112 is raised to releasing position.

As embodied the outer face of each block 107 is provided with a helically extending rib 134, the ribs 134 on the several blocks 107 being parallel to each other. The upper face of the helical rib 134 is designated as 136 and the lower face is designated as 137. Switch 130 is provided with a beveled ended actuating plunger 140 arranged for movement radially with respect to the disk member 90, and switch 131 is provided with a similar plunger 141, the plungers 140 and 141 being spaced from each other circumferentially of the disk 90, and also being spaced axially a distance equal to the distance between the uppermost point of the surface 136 and the lowermost point of surface 137 so that in the normal position of the slide blocks 107 they may pass idly by each switch without actuating either plungers 140 or 141.

As any one or all of the slide blocks 107 are raised, the upper surface 136 contacts with switch plunger 141 as the disk 90 rotates in a clock-wise direction past the stationary switch 131 mounted on the frame member 93, the time during which the switch 131 remains closed being determined by the extent to which the particular block 107 was raised above its normal position thereby varying the time of engagement of helical surface 136 with plunger 141. Likewise during the counter-clockwise rotation of the disk 90, the time during which switch 130 is closed by the particular block depends upon the extent to which the corresponding block 107 was lowered below its normal position, the plunger 140 being pressed by the helical surface 137.

Means are also provided for restoring the blocks 107 to their normal or idle position, and these means, together with releasing roller 124 are positioned between the switches 130 and 131 and extending inwardly from the frame member 93. As embodied there are provided a pair of pivotally mounted fingers 143 and 144, extending radially inwardly from their pivotal mounting on the pin 146. Fingers 143 and 144 are spaced apart and are so positioned that their inner ends cooperate with the inclined or helical ribs 134 while the rocker arms 112 are raised, and thereby force the slide 107 to its normal position. Each of the fingers 143 and 144 is provided with a stop portion 148 preventing movement in one direction beyond the radial position, while the movement in the other direction is lightly resisted by means of a spring pressed plunger 139. The fingers 143 and 144 are blocked against movement in opposite directions so that the upper finger 143 is moved aside as the disk member 90 rotates in a counter-clockwise direction, and the finger 144 moves aside after the disk rotates oppositely, thereby clearing the blocks 107 completely only after the disk 90 has made one complete cycle, that is a complete clockwise and one complete counter-clockwise revolution.

Figure 10:
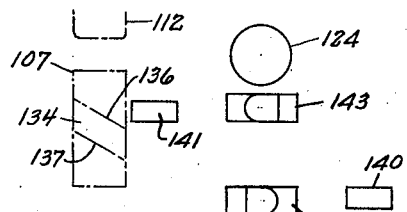

Figures 10 to 15 illustrate the various positions in the operation of the control means. In Figure 10, the helical surface 136 is approaching the switch plunger 141, and in the position shown in Figure 11 the switch plunger 141 is depressed remaining depressed until the helical rib 134 has completely passed the plunger, the duration of this switch closure depending upon the degree to which the rib 134 was raised.

Figure 13:
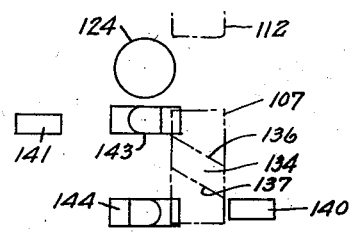
Figures 10 to 15 are diagrammatic views showing various relative portions of parts of the control means of Figures 6 and 7, in different stages of operation.
Figure 12:
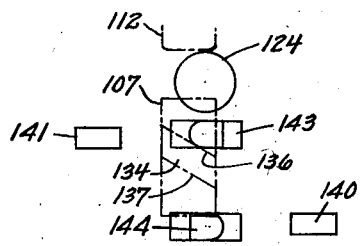
Figure 16:
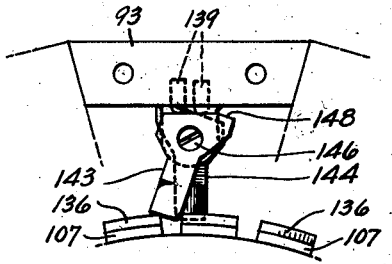
Figure 16 is a detailed view showing a different portion of certain of the parts shown in Figure 7.

In Figure 12 roller 124 has raised the rocker arm nose 123 to release the screw, and finger 143 has engaged the upper helical surface 136 to restore the block 107 to its normal central position. Figure 13 shows the relation of the parts when this restoration has been accomplished.

Figure 14:
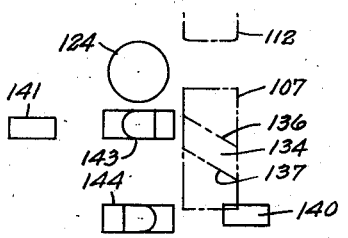
Figure 11:
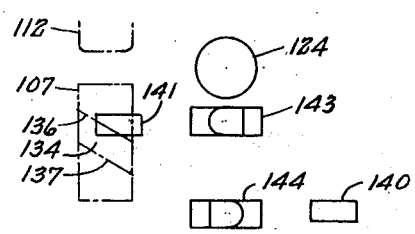
Figure 15:
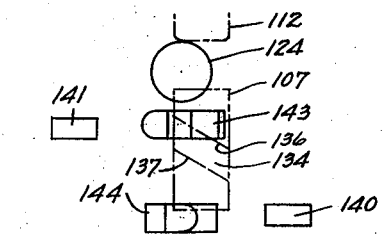

Figures 14 and 15 show the manner in which the rib 134 of a particular block 107 may pass idly by the restoring finger 143 as the disk 90 is moved in a counter-clockwise direction preliminary to a later actuation of the switch plunger 141 on the subsequent clockwise portion of the operating cycle.

Figure 17 of the drawings illustrates schematically the various circuit connections by which the parts are interconnected and supplied with power.

As illustrated power is supplied from the three phase mains 150, 151, 152 to drive the motor 70, and to cause actuation of the solenoid armature 75 in accordance with the setting of the various control screws 98, operation of the motor to rotate the control disk 90, and to move the actuating finger 67 in an ink increasing direction is caused by the push button 155, while operation in the reverse direction is had by pressing the push button 156. A stop button 158 is provided to stop the mechanism at any point of travel of the finger 67. A limit-reversing switch 160 is provided at one end of the fountain to be actuated as the actuating finger 67 reaches the corresponding end, while another limit switch 161 is provided at the other end of the fountain to prevent movement of the finger 67 too far in the other direction.

The switches 130 and 131 are also included in the circuit, and cause the solenoid armature 75 to be actuated in timed relation with the passage of the control blocks 107 past the switches 130 and 131, also in timed relation to the passage of the rack 67 past the various gears 56, thereby selectively and accurately setting the various fountain columnar adjusting screws 50 in accordance with the setting of the various control screws 98.

A multiple pole holding relay 170 is provided in the circuit and is moved to closed position by pressing the push button 155, thereby placing the switch 130 in series with the winding of solenoid 75, and at the same time supplying current to the motor 70 through limit switch 160 so as to move the actuating rack or finger 67 from left to right (Figure 3) or toward the limit switch 160, thereby increasing the feed of ink to selective columns.

As the threaded block 62 reaches limit switch 160, this switch is opened and closes its other contact, thereby automatically reversing the motor 70 to move the actuating finger or rack 67 from right to left to effect the desired decrease in the ink supply to selective columns. Motor 70 continues to operate until threaded block 62 reaches limit switch 161 opening this switch, and thereby stopping the motor 70. During this reverse operation switch 131 was actuated by the selected control blocks 107 to cause actuation of the solenoid 75 as the actuating finger 67 passed the selected columnar adjusting screws 50 thereby causing a decrease in the feed of ink to the various columns.

A stop push button 158 which is normally closed is provided so that the operation of motor 70 and the travel of the actuating finger 67 may be stopped at any point, and a reverse or ink decreasing push button 156 is provided which may be closed momentarily to cause the motor 70 to rotate in a reverse direction to move the threaded block 62 from right to left of the fountain.

The various circuit connections may be described as follows. Reversible motor 70 has its center tap connected to main 150 by conductor 180, while conductor 180 also provides one of the conductors through which current is supplied with the winding of solenoid 75. Main 151 is connected by conductor 181 to one contact of the normally closed stop button 158, as well as to one contact of the normally open holding relays 170, 171 through conductor 182. Main 152 is connected through conductor 183 to the windings of holding relay magnets 173, 174, as well as to one of the normally open contacts of each of the holding relays. The contacts 185 and 186 of each of the holding relays form a reversing switch for supplying current to the conductors 187, 188 so that when holding relay 170 is closed motor 70 operates in an ink increasing direction, and operates in an ink decreasing direction when the holding relay 171 is closed.

Normally the parts are started in operation by pressing push button 155 and thereby current is supplied from main 151 through conductor 181, stop button 158, conductor 189, limit switch 160, conductor 190, contact 191, conductor 192, contact 193, conductor 194, which completes the circuit through magnet winding 173, conductor 183 to main 152, thereby causing closure of the holding relay 170. As motor 70 drives shaft 60 actuating finger 67 is moved from left to right of the fountain and the gear 96 and the control member 90 are moved in a counter-clockwise direction.

Any of the control blocks 107 which have been raised above their normal position cause closure of switch 130 for periods of varying length in timed relation to the passage of the actuating finger past the gears 56 and their respective adjusting screws 50, the actuating finger being moved toward and from the gears by operation of the solenoid 75. Solenoid 75 is connected from conductor 180 through its winding to conductor 196 through switch 130, conductor 197, contacts 198 held closed by the holding relay 170, conductor 199 which is connected to main 152 through conductor 183.

When the traverse of actuating finger 67 has been completed, limit switch 160 is opened and moved into contact with its other contact 200 thereby establishing a circuit from main 151, conductor 181, stop button 158, conductor 189, contact 200, conductor 201, winding 174, conductor 183 and main 152 thereby energizing the holding relay 171 to move its contacts to closed position. Closure of relay 171 causes motor 70 to be reversed, thereby moving the control finger 67 and the gear 96 and control member 90 in the opposite direction causing switch 131 to be periodically closed. As this switch is closed, current is supplied from main 152 through conductor 183, conductor 199, contact 203, conductor 204, switch 131, conductor 196, the winding of solenoid 75 and conductor 180 to main 150.

Motor 70 continues to run in the reverse direction effecting the selective decrease in columnar supply of ink until threaded block 62 opens switch 161, thereby interrupting the supply of current to the magnet winding 174, and bringing the mechanism to rest.

Stoppage of the mechanism at any point in its travel may be secured by opening push button 158, thereby interrupting the supply of current to the holding coils of relays 170 and 171.

With the mechanism in any intermediate position, its operation in the reverse direction may be started by closure of push button 156 which causes holding relay 171 to be energized in the same manner as by limit-reversing switch 160 and contact 200.

Contact 205 serves to shunt push button 155 when holding relay 170 is closed and similarly contact 206 shunts push button 156 when holding relay 171 is closed, thereby preventing accidental actuation of either holding relay while the other is held closed.

In order to prevent excessive movement of any of the adjusting screws 50, their gears 54 are preferably mutated as at 54', thereby allowing them to be turned approximately three-quarters of a turn under the control of the control member 90. When a greater adjustment in either ink increase or ink decrease direction is required, the individual screws or any one of them may be turned by their wings 53 so as to bring the teeth of the corresponding gears 54 into mesh with pinions 55.

Figure 19:
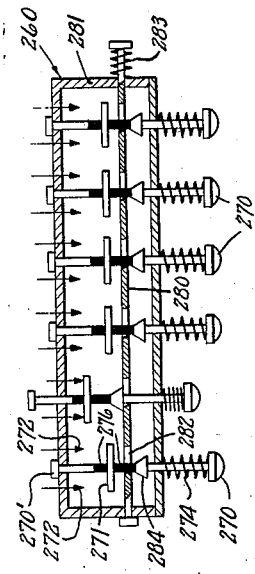
Figure 19 is a cross sectional view of electrical switch means used in the embodiment of Figure 18.
Figure 18:
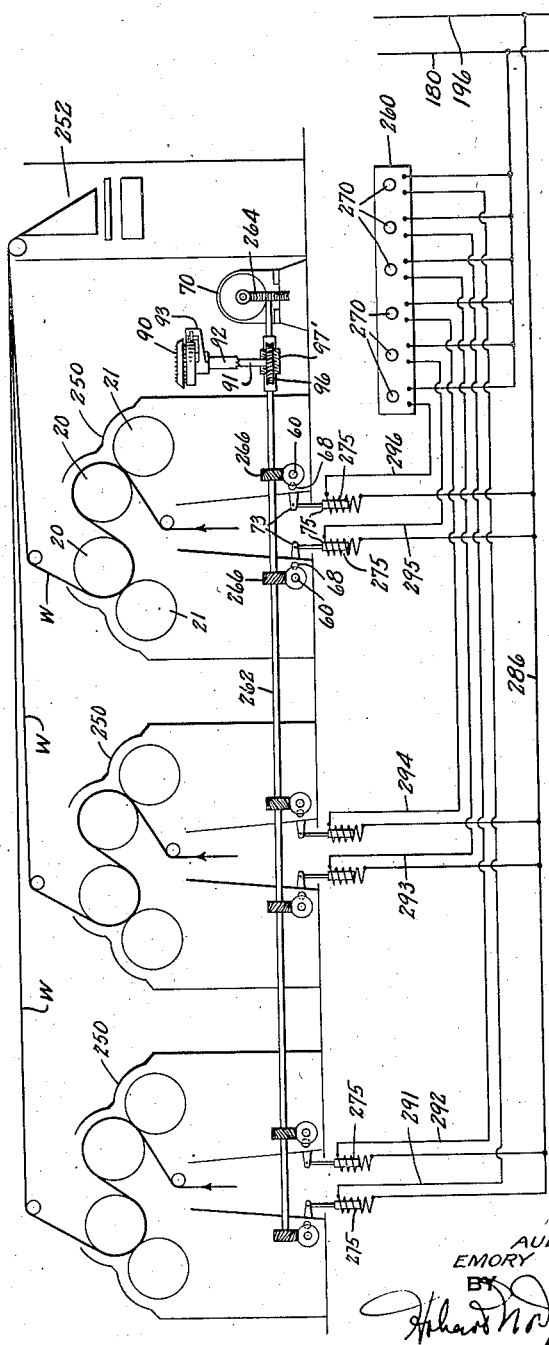
Figure 18 is a schematic view illustrating the present invention as applied to a plurality of printing units.

As illustratively shown in Figures 18 and 19 of the accompanying drawings, the invention may be applied to the inking mechanisms of a plurality of printing units, the several inking mechanisms being selectively controlled by a single control member, and most of the component parts being identical with those previously described. The printing units are shown as perfecting units of a newspaper press and the several printing units 250 are arranged in line series with their cylinders 20 and 21 parallel to each other and delivering the several webs W to a conventional folder 252. Each of the inking mechanisms, two being provided for each perfecting unit 250, is provided with the dog traversing shaft 60, and in its constructional details the dog traversing means and columnar adjusting means may be identical with that described above and shown in Figures 1 to 5.

Near one end of the press is provided the reversible motor 70 which serves to traverse one or another of the dogs 62, the selection of the dog to be traversed being under control of the manual control device 260. Motor 70 drives shaft 262 in one direction or another through reduction gearing 264, the direction of rotation of the motor being controlled by push buttons 155, 156 and 158 in accordance with the circuit shown in Figure 17. Shaft 262 carries a worm 97' by which the worm gear 96 of the control means 90 is similarly driven in one direction or another, as previously described. Shaft 262 is connected to drive the dog traversing shafts 60 through the miter gears 266 so that all of the dogs 62 are traversing back and forth across their respective fountains in uniform and timed relation with the rotation of the shaft 91 of the control means 90.

For moving the dogs 62 selectively into and out of engagement with the pinions 56 each of the inking mechanisms is provided with its individual solenoid winding 275 which serves to actuate the corresponding armature 75 to rock the selective one of the shafts 68.

The manual control means for selecting the inking mechanism to be adjusted from the single control member 90 comprise a number of push buttons 270 each of which carries a movable contact 271 adapted to bridge contacts 272 thereby closing one of the circuits between conductors 180 and 196 and through the corresponding solenoid winding 275. While these manual control means 260 may be of any desired form, they are preferably of the general type shown in Figure 19 and include means for releasably maintaining the selected contact 271 in circuit closing position until another push button 270 has been moved. Each of the push buttons 270 is provided with a compression spring 274 tending to move the push button to open circuit position. A stop 275 limits the travel of the push button rod, and the contact 271 is mounted on the rod and insulated therefrom by insulation 276. A holding plate 280 is slidably mounted in the ends of the casing 281 and is provided with key hole apertures 282 through which the push button rods extend. A spring 283 serves to bias the plate 280 towards locking position and the small conical members 284 carried by each push button rod serve to cam the plate to release position as well as to hold the selected push button in closed position. As shown the second push button is closed and remains closed until another push button is selected and moved to closed position. This movement automatically releases the second push button and the newly selected push button remains in closed position until the next selection is made. The several solenoid windings 275 are connected with conductor 196 by the common branch conductor 286, while the individual branch conductors 291, 292, 293, 294, 295 and 296 connect the individual solenoids through their respective push buttons 270 to the conductor 180.

When the pressman sees that a particular unit requires adjustment of its inking mechanism he sets the control screws 98 in accordance with the requirements of that unit and then pushes the appropriate push button 270 and thereafter the appropriate direction button 155 or 156. The motor 70 rotates to drive all of the dogs 62 across their respective fountains, but only the dog corresponding to the particular unit to be adjusted is rocked into and out of contact with its pinions 56, inasmuch as only one of the solenoid windings 275 is in circuit. In other respects the circuit connections of the embodiment shown in Figures 18 and 19 may be a duplicate of the circuit described previously and shown in Figure 17.

The invention in its broader aspects is not limited to the specific mechanisms shown and described but departures may be made therefrom within the scope of the accompanying claims without departing from the principles of the invention and without sacrificing its chief advantages.

What we claim is:

1. In an ink fountain having having regulable ink feeding means lengthwise of the fountain, the combination of a plurality of adjusting means for different lengthwise portions of the fountain arranged in a line series, a motor driven member movable in a predetermined cycle along the series, and means for automatically moving the member into and out of actuating contact with the adjusting means.

2. In an ink fountain having regulable ink feeding means lengthwise of the fountain, the combination of a plurality of adjusting means for different lengthwise portions of the fountain arranged in a line series, a motor driven member movable in a predetermined cycle along the series, and means for automatically moving the member into and out of actuating contact with the adjusting means, said member automatically increasing the feed of ink by movement in one direction and decreasing the feed of ink in the other direction in a preselected amount.

3. In an ink fountain having regulable ink feeding means lengthwise of the fountain, the combination of a plurality of adjusting means for different lengthwise portions of the fountain arranged in a line series, a motor driven member movable along the series, means for automatically moving the member into and out of actuating contact with the adjusting means said member automatically increasing the feed of ink by movement in one direction and decreasing the feed of ink in the other direction in a preselected amount, and means for automatically reversing the motor driven means at the end of its movement in one direction.

4. In an ink fountain having regulable ink feeding means lengthwise of the ink fountain, the combination of a doctor blade extending the length of the fountain, a plurality of adjusting screws for regulating the ink fed past the blade, said screws being arranged in a line series, a gear on each screw, a travelling member engageable with the gears to rotate the screws, a motor for driving the member in a predetermined cycle, and means for moving the member into and out of engagement with the gears as it passes them selectively and in automatic sequence.

5. In an ink fountain having regulable ink feeding means lengthwise of the ink fountain, the combination of a doctor blade extending the length of the fountain, a plurality of adjusting screws for regulating the ink fed past the blade, said screws being arranged in a line series, a gear on each screw, a travelling member engageable with the gears to rotate the screws, a motor for driving the member in a predetermined cycle, means for moving the member automatically into and out of engagement with the gears as it passes them means for reversing the motor at the end of its travel and remote control means for selectively controlling the engaging movement of the member.

6. In a multi-unit rotary printing press having a plurality of printing cylinders each having an ink supply means including an ink fountain regulable column by column to feed regulated amounts of ink and a travelling member automatically operating to vary the regulation of the ink feed column by column, a common control member and means for selectively connecting the control member for regulation of a selected one of the ink fountains.

7. In a multi-unit rotary printing press having a plurality of printing cylinders each having an ink supply means including an ink fountain regulable column by column to feed regulated amounts of ink and a travelling member automatically operating to vary the regulation of the ink feed column by column operable in one direction to decrease the feed of ink and then operable in a reverse direction to increase the feed of ink, a control member common to all the units and operating in timed relation to the travelling member and means for selectively connecting the control member to a selected unit for varying the regulation of that fountain.

8. In a multi-unit rotary printing press having a plurality of printing cylinders each having an ink fountain, a doctor blade extending the length of the fountain, a plurality of adjusting screws for regulating the ink fed past the blade, said screws being arranged in line series, a gear on each screw, a travelling member engageable automatically with the gears to rotate the screws, and means for moving the member into and out of engagement with the gears as it passes them, a control unit common to a plurality of ink fountains, means for selectively connecting one of the ink fountains to the control member to control engagement of the travelling member with the gears, and a motor for driving the control member and selected travelling member in timed relation.

9. Ink supply means including in combination a fountain roll, a doctor blade extending across different columnar portions of the fountain, columnar adjusting screws for the doctor blade, a gear for each screw, a member automatically moving into successive cooperation with the gears and selectively engageable with the gears to move said gears to increase the feed of ink and reversely movable to cooperate successively with selected gears to decrease the feed of ink in selected columns, and means for timing the engagement of said member with the gears in timed relation to the movement of said member.

10. Ink supply means including in combination a fountain roll, a doctor blade extending across different columnar portions of the fountain, columnar adjusting screws for the doctor blade, a gear for each screw, and a member automatically moving into successive cooperation with the gears and selectively engageable with the gears in succession to increase the feed of ink and reversely movable to cooperate successively with selected gears to decrease the feed of ink in selected columns and a reversible motor for driving said moving member, and means for timing the engagement of said member with the gears in timed relation to the movement of said member.

11. Ink supply means including in combination a fountain roll, a doctor blade extending across different columnar portions of the fountain, columnar adjusting means for the doctor blade, a travelling member operating in a predetermined cycle automatically to adjust the adjusting means of the doctor blade selectively column by column, and control means at the end of the fountain cooperable with the travelling member and controlling the operations thereof in accordance with a manually preselected position of the control means.

12. Ink supply means for rotary printing presses including in combination an ink fountain having regulable means for feeding variable amounts of ink from different columnar portions of the fountain, control means manually preset at an end of the fountain, a travelling member, means automatically moving said travelling member through a preselected cycle, and means interconnecting said control means and said travelling member for selectively actuating said regulable means thereby column by column, in accordance with the preset position of the control means.

13. Ink supply means for rotary printing presses including in combination an ink fountain having regulable means for feeding variable amounts of ink from different columnar portions of the fountain, control means manually preset at an end of the fountain, a power driven travelling member, means for automatically moving said travelling member through a preselected cycle, and means interconnecting said control means and said travelling member for selectively actuating said regulable means thereby column by column, in accordance with the preset position of the control means.

14. Ink supply means for rotary printing presses including in combination an ink fountain having portions individually regulable to vary the amount of ink fed from different columnar portions of the fountain, a member having individual controls each corresponding to a particular columnar portion of the fountain, a power driven travelling member, means for moving said travelling member along said fountain in a predetermined cycle of movement and means carried by said traveling member operable on successive columnar portions of the fountain by the travel of said travelling member for individually regulating the ink fed column by column in accordance with the individual controls.

15. Ink supply means for rotary printing presses including in combination an ink fountain having a fountain roll and doctor blade, regulable means for varying the position of the blade relative to the fountain roll, a travelling member automatically moving in a predetermined cycle including means for engaging said regulable means successively to vary the ink feed, and regulable means for controlling the engaging movements of the travelling member, and means for timing the engagement of the travelling member by said controlling means, said member and controlling means being interconnected for simultaneous movements.

16. Ink supply means for rotary printing press including in combination an ink fountain having regulable ink feeding means lengthwise of the fountain, a travellable regulating member, means for travelling said member, means automatically engaging successively with the ink feeding means as it travels to vary the ink feed, and means for selectively controlling the movements and the amount of regulation by the travelling member from a position at an end of the fountain.

AUBURN TAYLOR.
EMORY W. WORTHINGTON.